United States Patent
Peerlings et al.

(10) Patent No.: US 8,497,341 B2
(45) Date of Patent: Jul. 30, 2013

(54) TRANSPARENT THERMOPLASTIC POLYURETHANES HAVING LOW HAZE AND GOOD PROCESSABILITY, METHODS OF MAKING THE SAME, AND USES THEREFOR

(75) Inventors: Henricus Peerlings, Solingen (DE); Faisal Shafiq, Kaarst (DE); Markus Broich, Hückelhoven (DE)

(73) Assignee: Bayer MaterialScience AG (DE)

( * ) Notice: Subject to any disclaimer, the term of this patent is extended or adjusted under 35 U.S.C. 154(b) by 711 days.

(21) Appl. No.: 12/358,356

(22) Filed: Jan. 23, 2009

(65) Prior Publication Data
US 2009/0189314 A1 Jul. 30, 2009

(30) Foreign Application Priority Data
Jan. 25, 2008 (DE) .......................... 10 2008 006 003

(51) Int. Cl.
*C08G 18/32* (2006.01)
*C08G 18/73* (2006.01)

(52) U.S. Cl.
USPC ............................................. 528/79; 528/85

(58) Field of Classification Search
USPC .................................................... 528/79, 85
See application file for complete search history.

(56) References Cited

U.S. PATENT DOCUMENTS

| | | | | |
|---|---|---|---|---|
| 3,730,936 A | * | 5/1973 | Bugmann | 524/871 |
| 4,741,961 A | * | 5/1988 | Frisch et al. | 428/412 |
| 2003/0166794 A1 | | 9/2003 | Muehlfeld et al. | |
| 2006/0142531 A1 | | 6/2006 | Peerlings et al. | |

FOREIGN PATENT DOCUMENTS

| | | |
|---|---|---|
| DE | 1964834 | 7/1971 |
| DE | 2901774 A1 | 7/1980 |
| EP | 1336631 | 8/2003 |
| EP | 1674494 | 6/2006 |
| GB | 1057018 | 2/1967 |
| WO | WO-02/50151 A1 | 6/2002 |
| WO | WO-2008/057101 | 5/2008 |

* cited by examiner

*Primary Examiner* — Rabon Sergent
(74) *Attorney, Agent, or Firm* — Novak Druce Connolly Bove + Quigg LLP

(57) ABSTRACT

Light-stable, thermoplastic polyurethanes with good processability and having an ASTM D-1003 haze value of less than 10%, the polyurethane prepared by a process comprising: reacting: (a) a diisocyanate component comprising 1,6-hexamethylene diisocyanate; (b) a chain extension component consisting of (b1) 1,4-di(β-hydroxyethyl)hydroquinone and (b2) at least one chain extender selected from the group consisting of diols having a 2 or 3 carbon atom chain length between the two OH groups, in a molar ratio of chain extender (b1) to chain extender (b2) of 10:1 to 1:4; and (c) at least one polyol component having a number average molecular weight of 450 to 10000 g/mol, and an average number of Zerewitinoff-active hydrogen atoms of at least 1.8 to at most 3.0; wherein the ratio of isocyanate groups in component (a) to isocyanate-reactive groups in components (b) and (c) is 0.9:1 to 1.1:1.

13 Claims, No Drawings

TRANSPARENT THERMOPLASTIC POLYURETHANES HAVING LOW HAZE AND GOOD PROCESSABILITY, METHODS OF MAKING THE SAME, AND USES THEREFOR

BACKGROUND OF THE INVENTION

Thermoplastic polyurethanes (TPUs) are of great technical significance because of their good elastomer properties and thermoplastic processability. Kunststoff Handbuch [G. Becker, D. Braun], volume 7, "Polyurethane", Munich, Vienna, Carl Hanser Verlag, 1983, for example gives an overview of the production, properties and applications of TPUs.

TPUs are mostly composed of linear polyols (macrodiols), such as polyester diols, polyether diols or polycarbonate diols, organic diisocyanates and short-chain, mostly difunctional alcohols (chain extenders). They can be produced continuously or discontinuously. The best-known production processes are the belt process (e.g., British Patent Pub. No. GB1057018) and the extruder process (e.g., German Patent Pub. No. DE1964834), the entire contents of each of which is hereby incorporated herein by reference.

The thermoplastically processable polyurethane elastomers can be produced either stepwise (prepolymer metering process) or by the simultaneous reaction of all components in one stage (one-shot metering process).

In the use of aliphatic light-stable transparent materials, materials based on $H_{12}$-MDI which, however, have the disadvantage of a poor setting behaviour, are mostly used. Aliphatic light-stable transparent TPUs based on other materials such as e.g. HDI (hexamethylene diisocyanate) are therefore desirable as diisocyanate, these TPUs however being too cloudy for such applications.

International Patent Pub. No. WO 02/050151, the entire contents of which are hereby incorporated herein by reference, describes transparent TPUs based on ethylene oxide polyols, or ethylene oxide-propylene oxide polyols with mixed chain extension, wherein one of the chain extension components is selected from the group ethylene glycol, diethylene glycol or 1,3-propanediol. In the examples, only TPUs based on aromatic isocyanates that are not light-stable are described.

BRIEF SUMMARY OF THE INVENTION

The present invention relates, in general, to light-stable, transparent, thermoplastic polyurethane molding compositions based on 1,6-hexamethylene diisocyanate with a haze of less than 10%, according to ASTM D 1003, with good technical processability, and uses thereof.

Thermoplastic, light-stable polyurethanes (TPUs) based on 1,6-hexamethylene diisocyanate according to the various embodiments of the present invention exhibit haze values of less than 10% according to ASTM D-1003, while at the same time exhibiting good technical processability.

The present invention therefore includes light-stable, thermoplastic polyurethanes with a haze of less than 10% according to ASTM D-1003 which are obtainable from
 a) 1,6-hexamethylene diisocyanate (1,6-HDI) and optionally other aliphatic diisocyanates different from 1,6-HDI,
 b) a chain extension component consisting of
  b1) 1,4-di(β-hydroxyethyl)hydroquinone and
  b2) at least one chain extender consisting of a diol with 2 or 3 carbon-atoms in the chain between the two OH groups,
  wherein the molar ratio of chain extender b1) to chain extender b2) is 10:1 to 1:4,
 c) at least one polyol component with a number average molecular weight of 450 to 10000 g/mol and on average at least 1.8 to at most 3.0 Zerewitinoff-active hydrogen atoms,
  wherein the ratio of the number of isocyanate groups in component a) to the number of groups reactive to isocyanate in components b), c) and optionally g) is 0.9:1 to 1.1:1,
 optionally in the presence of
 d) catalysts and with addition of
 e) 0.1 to 10 wt. %, based on thermoplastic polyurethane, light stabilisers,
 f) optionally additives and/or auxiliary substances,
 g) optionally chain terminators.

One embodiment of the present invention includes light-stable, thermoplastic polyurethanes having an ASTM D-1003 haze value of less than 10%, the polyurethane prepared by a process comprising: reacting:
 (a) a diisocyanate component comprising 1,6-hexamethylene diisocyanate;
 (b) a chain extension component consisting of (b1) 1,4-di (β-hydroxyethyl)hydroquinone and (b2) at least one chain extender selected from the group consisting of diols having a 2 or 3 carbon atom chain length between the two OH groups, in a molar ratio of chain extender (b1) to chain extender (b2) of 10:1 to 1:4; and
 (c) at least one polyol component having a number average molecular weight of 450 to 10000 g/mol, and an average number of Zerewitinoff-active hydrogen atoms of at least 1.8 to at most 3.0,
 wherein the ratio of isocyanate groups in component (a) to isocyanate-reactive groups in components (b) and (c) is 0.9:1 to 1.1:1.

Another embodiment of the present invention includes light-stable, transparent molded articles comprising a polyurethane according to the invention.

Other embodiments of the present invention include processes for preparing a light-stable, transparent molded article, the processes comprising: (i) providing a polyurethane according to claim 1; and (ii) subjecting the polyurethane to injection molding and/or extrusion.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a chain extension component" herein or in the appended claims can refer to a single chain extension component or more than one chain extension component. Additionally, all numerical values, unless otherwise specifically noted, are understood to be modified by the word "about."

In addition to 1,6-hexamethylene diisocyanate as the main component, the following aliphatic diisocyanates as secondary component (up to 30 mol %) can be used as organic diisocyanates a): ethylene diisocyanate, 1,4-tetramethylene diisocyanate, 1,12-dodecane diisocyanate; cycloaliphatic diisocyanates such as isophorone diisocyanate, 1,4-cyclohexane diisocyanate, 1-methyl-2,4-cyclohexane diisocyanate and 1-methyl-2,6-cyclo-hexane diisocyanate and the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures. 1,4-cyclohexane diisocyanate, isophorone diisocyanate and dicyclohexylmethane diisocyanate are preferably used. The named diisocyanates can be used singly or in the form of mixtures with one another. They can also be used together with up to 15 mol % (based on total isocyanate component) of a polyisocyanate, but at most as much polyisocyanate can be added that produces a still thermoplastic processable product.

A diol with 2 or 3 carbon atoms between the two OH groups [HO—(—C(R')(R")—)$_{2\ or\ 3}$OH, wherein R' and R", independent of one another, are alkyl groups with 1 to 6 C atoms] is used as chain extender b2), preferably from the group consisting of 1,2-ethylene glycol, 1,2-propanediol, 1,3-propanediol, 2,2-dimethyl-1,3-propanediol, 2-methyl-1,3-propanediol, 2-ethyl-2-butyl-1,3-propanediol or mixtures thereof, wherein the molar ratio of chain extender b1) to chain extender b2) is 10:1 to 1:4.

Components with on average at least 1.8 to at most 3.0 Zerewitinoff-active hydrogen atoms and a number average molecular weight $\overline{M}_n$ of 450 to 10000 are used as component c).

In particular, compounds having two to three, preferably two, hydroxyl-groups are preferred, especially those with number average molecular weights $\overline{M}_n$ of 450 to 6000, particularly preferably those with a number average molecular weight $\overline{M}_n$ of 600 to 4500; polyesters, polyethers and polycarbonates having hydroxyl groups are particularly preferred. As a result of production, the polyols often contain small quantities of non-linear compounds. The expression "substantially linear polyols" is therefore often used. Polyester diols, polyether diols, polycarbonate diols or mixtures of these are preferred.

Suitable polyether diols can be produced by reacting one or more alkylene-oxides with 2 to 4 carbon atoms in the alkylene radical with a starter molecule that contains two active hydrogen atoms bound. The following for example can be named as alkylene oxides: ethylene oxide, 1,2-propylene oxide, epichlorohydrin and 1,2-butylene oxide and 2,3-butylene oxide, Ethylene oxide, propylene oxide and mixtures of 1,2-propylene oxide and ethylene oxide are preferably used. The alkylene oxides can be used singly, alternately one after the other or as mixtures. The following come into consideration for example as starter molecules: water, amino alcohols, such as N-alkyl-diethanolamines, for example N-methyl diethanolamine and diols such as ethylene glycol, 1,3-propylene glycol, 1,4-butanediol and 1,6-hexanediol. Mixtures of starter molecules can also optionally be used. Suitable polyether polyols are furthermore the hydroxyl group-containing polymerisation products of tetrahydrofuran. Trifunctional polyethers in quantities of 0 to 30 wt. % based on the bifunctional polyethers can also be used, but at most in a quantity such that a still thermoplastically processable product is produced. The substantially linear polyether diols preferably have number average molecular weights $\overline{M}_n$ of 450 to 6000. They can be used both singly and in the form of mixtures with one another.

Suitable polyester diols can be produced for example from dicarboxylic acids with 2 to 12 carbon atoms, preferably 4 to 6 carbon atoms, and multivalent alcohols. The following for example come into consideration as dicarboxylic acids: aliphatic dicarboxylic acids, such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids can be used singly or as mixtures, e.g. in the form of a succinic, glutaric and adipic acid mixture. It can optionally be advantageous for the production of the polyester diols to use the corresponding dicarboxylic acid derivates, such as carboxylic acid diesters with 1 to 4 carbon atoms in the alcohol radical, carboxylic acid anhydrides or carboxylic acid chlorides, instead of the dicarboxylic acids. Examples of multivalent alcohols are glycols with 2 to 10, preferably 2 to 6 carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. Depending on the desired properties, the multivalent alcohols can be used alone or in mixture with one another. Esters of the carbonic acid with the named diols, in particular those with 4 to 6 carbon atoms, such as 1,4-butanediol or 1,6-hexanediol, condensation-products of ω-hydroxycarboxylic acids, such as ω-hydroxycaproic acid or polymerisation products of lactones, e.g. optionally substituted ω-caprolactones, are furthermore suitable. Ethanediol polyadipates, 1,4-butanediol polyadipates, ethanediol-1,4-butanediol polyadipates, 1,6-hexanediol neopentylglycol polyadipates, 1,6-hexanediol-1,4-butanediol polyadipates and polycaprolactones are preferably used as polyester diols. The polyester diols have number average molecular weights $\overline{M}_n$ of 450 to 10000 and can be used singly or in the form of mixtures with one another.

Monofunctional compounds reacting with isocyanates can be used in quantities of up to 2 wt. %, based on TPU, as so-called chain tenninators g). For example, monoamines, such as butylamine and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether, are suitable.

The relative quantities of the Zerewitinoff-active compounds are preferably selected so that the ratio of the sum of the isocyanate groups to the sum of the Zerewitinoff-active hydrogen atoms is 0.9:1 to 1.1:1.

The thermoplastic polyurethanes according to the invention can contain, as auxiliary substances and additives f), preferably up to 10 wt. %, based on the total quantity of TPU, of the conventional auxiliary substances and additives. Typical auxiliary substances and additives are lubricants and mold release agents, such as fatty acid esters, metal soaps thereof, fatty acid amides, fatty acid ester amides and silicone compounds, antiblocking agents, inhibitors, stabilisers against hydrolysis, heat and discolouration, dyes, pigments, inorganic and/or organic fillers, plasticizers, fungistatically and bacteriostatically active substances and mixtures thereof.

Further information on the named auxiliary substances and additives can be found in the specialist literature, for example the monograph by J. H. Saunders and K. C. Frisch "High Polymers", volume XVI, Polyurethane, parts 1 and 2, Verlag Interscience Publishers 1962 and 1964, the Taschenbuch für Kunststoff-Additive by R. Gächter and H. Müller (Hanser Verlag Munich 1990) or DE-A 29 01 774.

Other additives that can be incorporated into the TPU are thermoplastics, for example ethylene/vinyl acetate copolymers, styrene/butadiene copolymers and other TPUs.

UV stabilisers, antioxidants and/or HALS compounds preferably are used as light stabilisers e). Further information can be found in the specialist literature and described for example in Plastics Additives Handbook, 2001 5th. ed., Carl Hanser Verlag, Munich.

Suitable catalysts d) are the usual tertiary amines known from the prior art, such as e.g. triethylamine, dimethylcyclohexylamine, N-methyl morpholine, N,N'-dimethylpiperazine, 2-(dimethylaminoethoxy)ethanol, diazabicyclo[2,2,2] octane and similar, and in particular organic metal compounds such as titanic acid esters, bismuth compounds, iron compounds or tin compounds such as tin diacetate, tin dioctoate, tin dilaurate or the tin dialkyl salts of aliphatic carboxylic acids, such as dibutyl tin diacetate or dibutyl tin dilaurate or similar. Preferred catalysts are organic metal compounds, in particular titanic acid esters, iron compounds, tin compounds, zircon compounds and bismuth compounds.

The total quantity of catalysts in the TPUs according to the invention is as a rule preferably 0 to 5 wt. %, preferably 0 to 2 wt. %, based on the total quantity of TPU.

The addition of the auxiliary substances and additives can be carried out during the production process and/or in an additional compounding to the TPU.

The TPUs according to the invention are preferably used in the injection molding or extrusion process, such as e.g. film extrusion.

The TPUs according to the invention are preferably used to produce light-stable transparent molded articles.

The invention will now be described in further detail with reference to the following non-limiting examples.

EXAMPLES

| The following abbreviations are used: | |
|---|---|
| PE 225B | Polyester diol with a molecular weight of $M_n$ = 2250 g/mol; product of Bayer MaterialScience AG |
| A 2220N | Acclaim ® 2220N; polyetherdiol (mixed ether of $C_3$ and $C_2$ alkylene units) with a molecular weight of $M_n$ = 2250 g/mol; product of Bayer MaterialScience AG |
| T2000 | Terathane ® 2000; polytetrahydrofuran with a molecular weight $M_n$ of 2000 g/mol; product of Invista Inc. |
| T1000 | Terathane ® 1000; polytetrahydrofuran with a molecular weight $M_n$ of 1000 g/mol; product of Invista Inc. |
| De C2201 | Desmophen ® C2201; polycarbonate diol based on 1,6-hexanediol with a molecular weight $M_n$ of 2000 g/mol; product of Bayer MaterialScience AG. |
| AD 2055 | Baycoll ® AD 2055; poly(neopentylglycol-1,6-hexanediol)adipate with a molecular weight $M_n$ of 2000 g/mol; product Bayer MaterialScience AG |
| HDI | 1,6-hexamethylene diisocyanate |
| HDO | 1,6-hexanediol |
| BDO | 1,4-butanediol |
| PDO | 1,3-propanediol |
| 1,2-PDO | 1,2-propanediol |
| HQEE | 1,4-di(β-hydroxyethyl) hydroquinone |
| EG | ethylene glycol |
| NPG | neopentyl glycol |
| Irganox ® 1010 | antioxidant of Ciba Specialty Chemicals GmbH |
| Tinuvin ® 234 | light stabiliser based on a benzotriazole of Ciba Specialty Chemicals GmbH |
| DBTL | dibutyl tin dilaurate |

Examples

Inventive and Reference/Comparative

General Description of the Production of the TPU:

A mixture of 1 mole of polyol (c) with x moles of a chain extender (b1) and y moles of a chain extender (b2), and 0.5 wt. % Irganox® 1010 (based on the total TPU) and 60 ppm DBTL (based on the quantity of polyol) was heated to 130° C. with stirring using a blade stirrer at a speed of 500 revolutions per minute (rpm); (1+x+y) moles of HDI were then added. It was then stirred to the maximum possible viscosity increase and then the TPU poured out. The material was thermally retreated for 30 min. at 80° C. and then granulated. The exact recipes (information on (b1)), x, (b2) and y) are given in Table 1.

The haze was measured in accordance with ASTM D 1003 on 2 mm thick injection molded sheets which were produced with a polished mold. The values are also given in Table 1.

The processability was qualitatively assessed on injection molded sheets which were produced on an injection molding machine. The demoldability and surface quality of the injection molded sheet were thereby noted.

TABLE 1

| Example | | Polyol (c) [1 mole] | Chain extender 1 | Mole x | Chain extender 2 | Mole y | Haze [%] | Ratio HQEE/CE2 | Processability |
|---|---|---|---|---|---|---|---|---|---|
| 1 | Reference | T2000 | HDO | 1.74 | none | 0 | 21 | — | good |
| 2 | Reference | PE 225B | BDO | 1.13 | none | 0 | 30 | — | good |
| 3 | Reference | AD 2055 | BDO | 0.28 | HDO | 1.12 | 38 | — | good |
| 4 | Reference | 0.7 PE225B/0.3 A 2220N | HDO | 2.47 | none | 0 | 15 | — | good |
| 5 | Reference | T1000 | PDO | 1.4 | none | 0 | 3 | — | poor |
| 6 | Reference | T1000 | EG | 1.4 | none | 0 | 2.3 | — | poor |
| 7 | Reference | T1000 | EG | 1 | PDO | 1 | NM | — | not possible |
| 8 | Reference | T1000 | HQEE | 0.7 | none | 0 | 11 | ∞ | good |
| 9 | Reference | T1000 | HQEE | 0.1 | PDO | 1.2 | NM | 1:12 | poor |
| 10 | Reference | T1000 | HQEE | 0.2 | PDO | 1 | NM | 1:5 | poor |
| 11 | Inventive | T1000 | HQEE | 0.35 | PDO | 0.7 | 2.5 | 1:2 | good |
| 12 | Inventive | T1000 | HQEE | 0.5 | PDO | 0.4 | 4.2 | 5:4 | good |
| 13 | Inventive | T1000 | HQEE | 0.6 | PDO | 0.2 | 9 | 3:1 | good |
| 14 | Inventive | T1000 | HQEE | 0.5 | EG | 0.4 | 8 | 5:4 | good |
| 15 | Inventive | T1000 | HQEE | 0.5 | NPG | 0.4 | 8 | 5:4 | good |
| 16 | Inventive | T1000 | HQEE | 0.5 | 1.2-PDO | 0.4 | 8 | 5:4 | good |
| 17 | Reference | T1000 | HQEE | 0.5 | BDO | 0.4 | 15 | 5:4 | good |
| 18 | Inventive | C2201 | HQEE | 2 | PDO | 1.5 | 3.6 | 4:3 | good |
| 19 | Inventive | A 2220N | HQEE | 1.5 | PDO | 1.5 | 5.8 | 1:1 | good |
| 20 | Reference | Ex. 11 WO20/50151 | HQEE | 1.5 | EG | 1.5 | 67 | 1:1 | good |

NM = not measured because surface too poor
CE = Chain extender 1,6-hexanediol, 1,4-butanediol or mixtures thereof were used in reference examples 1 to 4. A good processability was in fact achieved, but the haze value was clearly above 10%.

1,3-Propanediol, 1,2-ethylene glycol or mixtures thereof were used in reference examples 5 to 7, wherein low haze values were in fact achieved but the processability was very poor or even not possible.

Either HQEE alone or a small quantity of HQEE with PDO was used in reference examples 8 to 10. In example 8, the processability was in fact good, but the haze was 11%. In examples 9 and 10, the relatively high quantities of PDO led to a very poorly processable material, as a result of which the haze could not be measured.

A combination of HQEE with PDO, EG, NPG or 1,2-PDO was used in examples 11 to 16 according to the invention. The haze there was below 10% and a good processability was achieved.

Reference example 17 describes the use of HQEE in combination with BDO as chain extender. A good processability was achieved, but the haze value at 15% was clearly too high.

Examples 18 and 19 according to the invention describe the use of a combination of HQEE with PDO with a polycarbonate diol or a C-3/C-2 ether as polyol. Both a good processability and also the desired low haze values were achieved.

Reference example 20 corresponds to example 11 from application WO 02/050151 and describes the use of HQEE with EG and a C-3/C-2 ether as polyol and MDI as diisocyanate. The processability was in fact good, but the haze value at 67% was clearly too high.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A light-stable, thermoplastic polyurethane having an ASTM D-1003 haze value of less than 10%, the polyurethane prepared by a process comprising: reacting:
   (a) a diisocyanate component comprising 1,6-hexamethylene diisocyanate;
   (b) a chain extension component consisting of (b1) 1,4-di (β-hydroxyethyl) hydroquinone and (b2) at least one chain extender selected from the group consisting of diols having a 2 or 3 carbon atom chain length between the two OH groups, in a molar ratio of chain extender (b1) to chain extender (b2) of 10:1 to 1:4; and
   (c) at least one polyol component having a number average molecular weight of 450 to 10000 g/mol, and an average number of Zerewitinoff-active hydrogen atoms of at least 1.8 to at most 3.0,
   wherein the ratio of isocyanate groups in component (a) to isocyanate-reactive groups in components (b) and (c) is 0.9:1 to 1.1:1.

2. The light-stable, thermoplastic polyurethane according to claim 1, wherein the process comprises: reacting (a), (b) and (c) in the presence of one or more additional components selected from the group consisting of (d) catalysts; (e) light stabilizers, in an amount of 0.1 to 10 wt. % based on the polyurethane; (f) additives and auxiliary substances; and (g) chain terminators.

3. The light-stable, thermoplastic polyurethane according to claim 1, wherein the at least one polyol component has a number average molecular weight of 450 to 6000 g/mol.

4. The light-stable, thermoplastic polyurethane according to claim 1, wherein the at least one polyol component has a number average molecular weight of 600 to 4500 g/mol.

5. The light-stable, thermoplastic polyurethane according to claim 1, wherein the diisocyanate component further comprises up to 30 mol % of a second aliphatic diisocyanate, based on total diisocyanate component.

6. The light-stable, thermoplastic polyurethane according to claim 1, wherein the at least one chain extender (b2) comprises one or more diols selected from the group consisting of 1,2-ethylene glycol, 1,2-propanediol, 1,3-propanediol, 2,2-dimethyl-1,3-propanediol, 2-methyl-1,3-propanediol, 2-ethyl-2-butyl-1,3-propanediol, and mixtures thereof.

7. A light-stable, transparent molded article comprising a polyurethane according to claim 1.

8. A process for preparing a light-stable, transparent molded article, the process comprising:
   (i) providing a polyurethane according to claim 1; and
   (ii) subjecting the polyurethane to injection molding.

9. A process for preparing a light-stable, transparent molded article, the process comprising:
   (i) providing a polyurethane according to claim 1; and
   (ii) subjecting the polyurethane to extrusion.

10. A light-stable, thermoplastic polyurethane having an ASTM D-1003 haze value of less than 10%, the polyurethane prepared by a process comprising: reacting:
   (a) a diisocyanate component comprising 1,6-hexamethylene diisocyanate and up to 30 mol % of a second aliphatic diisocyanate, based on total diisocyanate component;
   (b) a chain extension component consisting of (b1) 1,4-di (β-hydroxyethyl) hydroquinone and (b2) at least one chain extender selected from the group consisting of 1,2-ethylene glycol, 1,2-propanediol, 1,3-propanediol, 2,2-dimethyl-1,3-propanediol, 2-methyl-1,3-propanediol, 2-ethyl-2-butyl-1,3-propanediol, and mixtures thereof, in a molar ratio of chain extender (b1) to chain extender (b2) of 10:1 to 1:4; and
   (c) at least one polyol component having a number average molecular weight of 600 to 4500 g/mol, and an average number of Zerewitinoff-active hydrogen atoms of at least 1.8 to at most 3.0,
   wherein the ratio of isocyanate groups in component (a) to isocyanate-reactive groups in components (b) and (c) is 0.9:1 to 1.1:1.

11. A light-stable, transparent molded article comprising a polyurethane according to claim 10.

12. A process for preparing a light-stable, transparent molded article, the process comprising:
   (i) providing a polyurethane according to claim 10; and
   (ii) subjecting the polyurethane to injection molding.

13. A process for preparing a light-stable, transparent molded article, the process comprising:
   (i) providing a polyurethane according to claim 10; and
   (ii) subjecting the polyurethane to extrusion.

* * * * *